3,468,704
CARBOXYL-TERMINATED POLYESTERS AND COATING COMPOSITION DERIVED THEREFROM
Richard B. Graver, Savage, Minn., assignor to Ashland Oil & Refining Company, Ashland, Ky., a corporation of Kentucky
No Drawing. Filed Nov. 10, 1966, Ser. No. 593,315
Int. Cl. C08g 17/18; B44d 1/36
U.S. Cl. 117—161                                    8 Claims

ABSTRACT OF THE DISCLOSURE

Carboxyl-terminated polyesters are produced by esterification of a polycarboxylic acid and an epoxide which epoxide may contain residual hydroxy groups wherein the overall ratio of carboxylic acid groups to reactive sites formed by epoxide groups and hydroxyl groups is from 1.2–3:1, which polyesters are utilized as air drying curing agents for epoxides, particularly epoxidized fatty compounds such as fatty acid esters. Further, the polyester and the epoxide may be combined in coating compositions for application to substrates such as wood, metal, and concrete.

DISCLOSURE

The present invention relates to novel carboxyl-terminated, also referred to herein as acidic, polyesters derived from oxirane-containing compounds. One aspect of this invention relates to a multiple package coating vehicle containing, in a first package, an epoxy component and in a second package, a co-reactant for such epoxy component, comprising the carboxyl-terminated polyester of the present invention. When mixed together and properly applied to a suitable surface, the contents of these two packages react together to form a hard, dry, tack-free, flexible, mar-resistant coating.

Often it is desirable to use reactive components to form coating vehicles. However, some combinations of reactive components are so reactive that it is not possible, in a practical sense, to premix them in a single container which can be stored, sold, and shipped in commerce as such and still obtain the same desirable film properties. Instead, when these reactive components are mixed together in a single container, the components begin to react with each other, thereby causing the viscosity of the mixture to increase. Frequently, the viscosity will increase so substantially in a matter of hours that the mixture becomes unuseable.

As a consequence, those skilled in the coating art have become increasingly aware of the advantageous film properties which can be obtained by the use of two-package coating vehicles. Such coating vehicles, and particularly paints prepared from such vehicles, are stored, sold, and shipped in separate, complementary packages. The contents of the two packages are then mixed together at the time of use and the resulting mixture then applied to the surface in the usual fashion. In U.S. Patent 3,218,274, which is incorporated herein by reference, there is described and claimed such a two-package coating system. One of the two packages described in said patent contains an epoxidized fatty compound such as epoxidized soybean oil. The other package contains an acidic polyester which is used as a curing agent or co-reactant for the epoxidized fatty compound of the first package. At the time of use, the contents of the two packages are mixed together and the resulting mixture spread in film form on a suitable substrate, e.g. wood, and cured such as by baking or air-drying at room temperature, to thereby provide a decorative and/or protective coating.

One significant advantage of the described two-package coating composition has been its ability to form thin films which can cure at room temperature in the absence of a curing catalyst to hard, tack-free, mar-resistant, durable coatings. Cured coatings, particularly on such substrates as wood or metal, prepared from the two-package coating composition described in said patent have exhibited highly desirable properties in terms of (1) their non-yellowing tendency, (2) their ability to retain their original hard gloss for years without fading (although they can be made with a low gloss), (3) their durability, (4) their ability to be applied by brushing, spraying or rolling on common substrates such as wood, concrete, and metal, and (5) the ease with which dirt and common stains can be removed. On concrete or earthenware, this coating composition provides a glazed, ceramic-like appearance.

It has now been discovered that the coating compositions obtained by admixing the acidic polyester curing agent with the epoxidized fatty compound can be improved both before the material is cured and after the material has been cured, by virtue of the novel acidic polyesters forming the basis of the present invention. When employing the acidic polyester curing agents of the present invention in the coating compositions described in said patent, the rate of cure of thin films of epoxy/acidic polyester mixtures is significantly increased while the pot-like is not appreciably altered (compared with the epoxy/acidic polyester blends shown in U.S. Patent 3,218,274).

It is, therefore, an object of the present invention to provide novel acidic polyester compositions.

It is a further object of this invention to provide novel acidic polyester compositions which are useful in the formation of coating compositions when combined with epoxy compounds.

It is still another object of this invention to provide coating compositions employing the novel acidic polyesters of the present invention.

Yet another object of the present invention is to provide coating compositions employing a combination of epoxide and acidic polyester which are improved over similar compositions heretofore known.

Other objects will become apparent from the following description and claims.

THE NOVEL ACIDIC POLYESTER CURING AGENTS

The novel carboxyl-terminated polyester co-reactants of the present invention are esterification products of (1) a polycarboxylic acid compound with (2) an epoxide or a hydroxyl group containing epoxide having at least one and preferably from one to four epoxy groups per molecule, the overall ratio of reactive carboxylic acid groups to reactive sites (i.e. oxirane rings and hydroxyl groups) on the epoxide being from 1.2 to 3 and preferably from 1.5 to 2.2 and more preferably about 1.8. In establishing the reactive sites on the epoxide, the oxirane group is considered as containing two reactive sites and any hydroxyl group present in the molecule is considered as constituting a single reactive site. The term "polycarboxylic acid compound" is meant to define polycarboxylic acids and polycarboxylic acid anhydrides which can be saturated or unsaturated. The esterification of the polycarboxylic acid compound with the epoxide results in the novel acidic polyester curing agents which are characterized by acid values of greater than 50 and preferably greater than 80.

The epoxides employed in the formation of the novel acidic polyester co-reactants are epoxides of (a) reaction products of epichlorohydrin and dihydric phenols, (b) reaction products of aliphatic polyols and epichlorohydrin, and (c) cycloaliphatic epoxides. The reaction products of epichlorohydrin and dihydric phenols are well-known in the art and can be represented by the formula:

(I)

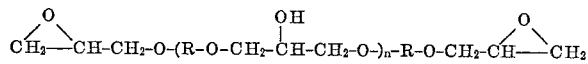

wherein $n$ is an integer of 0–10 and R is the hydroxyl-free residue of the polyhydric phenol. Suitable polyhydric phenols reacted with epichlorohydrin include mononuclear phenols such as resorchinol, catechol, hydroquinone, methylresorcinol, but preferably are polynuclear phenols such as 2,2-bis(4-hydroxyphenyl)propane, commonly known as bisphenol; 4,4'-dihydroxybenzophenone; bis(4-hydroxyphenyl)methane; 1,1-bis(4-hydroxyphenyl)ethane; 1,1-bis(4-hydroxyphenyl)isobutane; 2,2-bis(4-hydroxyphenyl)butane; 2,2-bis(4-hydroxy-2-methylphenyl)propane; 2,2-bis(4-hydroxy-2-tert-butylphenyl)propane, and 1,5-dihydroxynaphthalene.

Epoxides derived by the reaction of an aliphatic polyol containing from to 6 and preferably from 2 to 4 hydroxyl groups and epichlorohydrin can be represented by the general formula:

(II)

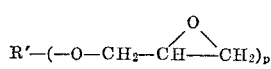

wherein $p$ is an integer of one or more and preferably of one to four and R' is the aliphatic residue of the polyol which has not reacted with the epichlorohydrin and thus can include unreacted hydroxyl groups. The term "aliphatic polyol" is meant to define polyols free of aromatic ring structures and thus includes not only polyols which are hydrocarbon polyols but also polyols which are addition products of such polyols and alkylene oxides as well as the addition products of alkylene oxides themselves. Suitable polyols from which the epoxides can be prepared include ethylene glycol, propylene glycol, glycerol, trimethylol ethane, trimethylol propane, sorbitol, pentaerythritol, dipentaerythritol, tripentaerythritol, neopentylglycol, β-methylglycerol, diglycerol, polyethylene glycol, polypropylene glycol, and addition products of the described polyols with either ethylene oxide or propylene oxide or mixtures of ethylene oxide and propylene oxide. It will be recognized that in the formation of the described aliphatic epoxides not all of the hydroxy groups on the polyol need to react with the epichlorohydrin and that consequently epoxides can be obtained from polyols which in addition to at least one epoxy group also contain unreacted hydroxyl groups.

The cycloaliphatic epoxides employed in combination with the polycarboxylic acid compound to form the novel polyester co-reactants are characterized by compounds containing at least one oxirane oxygen attached to an aliphatic ring. Preferably the cycloaliphatic epoxide contains one or more additional oxirane or hydroxy groups. Suitable cycloaliphatic epoxides include those represented by the following formulas:

(III)

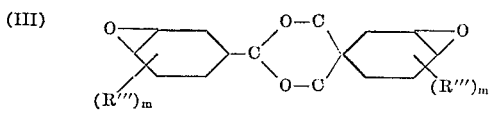

(IV)

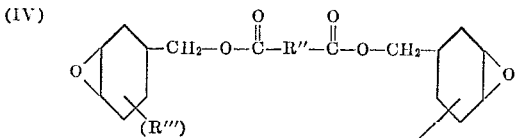

(V)

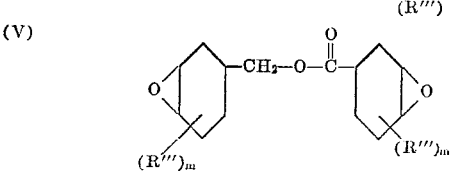

(VI)

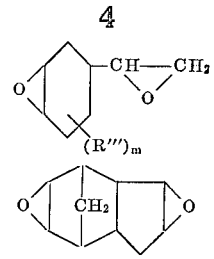

(VII)

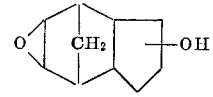

and (VIII)

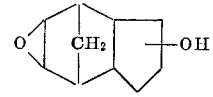

wherein R" is the carboxyl-free residue of a dicarboxylic acid and preferably an aliphatic dicarboxylic acid of 1 to 12 carbon atoms, R''' is a lower alkyl radical and preferably a methyl group, and $m$ is an integer from 0 to 4 and preferably 0 to 1. The cycloaliphatic diepoxides described above are well-known in the art (see U.S. Patent 2,716,123) and hence need not further description here.

It is to be understood that the foregoing described epoxides can be reacted with the polycarboxylic acid compound alone or as mixtures with each other. Thus, mixtures of one or more of the cycloaliphatic epoxides with each other or mixtures of such cycloaliphatic epoxides with, for example, epoxides obtained by the reaction of bisphenol with epichlorohydrin can be employed.

Any polycarboxylic acid compound containing from 2 to 4 carboxyl groups can be employed in the formation of the novel acidic polyester curing agent. Although aliphatic dicarboxylic and tricarboxylic acids are useful, the preferred acids are cycloaliphatic and aromatic polycarboxylic acids. In a particularly preferred embodiment of the present invention, at least part of the cycloaliphatic and aromatic acids employed are chlorinated. In such embodiment at least 5 mole percent and more usually from 25 to 75 mole percent of the mixture of polycarboxylic acid compounds employed will be a chlorinated polycarboxylic acid compound.

Suitable non-chlorinated polycarboxylic acid compounds include maleic acid; maleic anhydride; succinic anhydride; adipic acid; azaleic acid; pyromellitic anhydride; trimellitic acid; tetrahydrophthalic acid; hexahydrophthalic acid; isophthalic acid; phthalic anhydride; dihydrophthalic anhydride; and mixtures of such acids or anhydrides. Phthalic anhydride is the preferred non-chlorinated polycarboxylic acid compound.

Suitable chlorinated polycarboxylic acid compounds include dichloromaleic anhydride; hexachlorophthalaic acid; hexachlorophthalic acid anhydride; tetrachlorphthalic acid; monochlorophthalic acid; hexachloroendomethylene tetrahydrophthalic acid, and the like. Mixtures of chlorinated polycarboxylic acids or anhydrides can be used. Hexachloroendomethylene tetrahydrophthalic acid (i.e. chlorendic acid) and its anhydride are the preferred chlorinated polycarboxylic acid compounds.

In preparing the novel acidic polyester co-reactants, the relative amounts of epoxide and polycarboxylic acid compound should be selected to provide a ratio of the total number of reactive carboxyl groups to the total number of reactive sites on the epoxide of from 1.2:1 to 3:1. Preferably this ratio will be within the range of from 1.5:1 to 2.2:1 and even more preferably about 1.8 carboxyl groups for each reactive site on the epoxide. The esterification reaction is conducted by heating mixtures of the epoxide and the polycarboxylic acid compound, preferably in the presence of a solvent such as an aromatic hydrocarbon, at sufficiently elevated temperatures to cause the removal of water of reaction. The reaction is continued until all or substantially all (i.e. greater than 90%) of the reactive sites on the epoxide have been esterified. This is accomplished by continuing the reaction until no further water of reaction is distilled out of the reaction mixture. The theoretical amount of water to be released in the reaction can be readily calculated and thus compared to the amount actually obtained. As will be further apparent from the following examples, the reaction conditions described fall within the art on esterification techniques heretofore developed and it will be apparent that various modifications in the specific techniques employed can be made. The resulting esterification reaction product, i.e. the novel acidic polyester curing agent, should have an acid value of at least 50 and preferably of at least 80. Acid values over 100 are especially desirable.

USE OF THE NOVEL ACIDIC POLYESTER CURING AGENT

The novel acidic polyesters are used as co-reactants or curing agents for various epoxy components. For most coating compositions, from 50–250 parts by weight of the novel polyester co-reactant will be used per 100 parts by weight of epoxy component. Optimum results usually occur with from 100–150 parts by weight of modified polyester employed per 100 parts by weight of epoxy component. One or both components can be diluted with inert solvent such as described in U.S. 3,218,274.

The novel polyesters of the present invention can be employed alone or in combination with other acidic polyesters such as described in U.S. 3,218,274 as the co-reactant for the epoxy component. Such mixtures can be obtained by admixing the preformed acidic polyesters or by admixing polyols, for example, with the described epoxides and reacting the resulting mixture with the polycarboxylic acid. In the latter case, it will be apparent that additional acid is required to maintain the necessary ratio of acid to reactive sites.

If desired, various pigments, fillers, extenders, dyes, dryers, stabilizers, and the like, can be added to the epoxy component, to the acidic polyester component, or to the resulting mixture to thereby form, for example, a paint. The resulting mixture can be applied to a suitable surface, e.g. applied to wood by brushing to thereby form a thin, wet film. These wet films then cure to a tack-free state. Curing can take place at room temperature (e.g. 77° F.) or can be accelerated by baking. Partial pre-reaction of the epoxy and polyester components, as well as catalysis, can be used to speed the curing or drying time. However, it should be noted that the coating vehicles of the present invention can co-react and cure in the absence of any additional or supplemental co-reactants, curing agents, or catalysts.

The epoxy component can be an epoxidized fatty compound (e.g. epoxidized linseed oil), a bisphenol-epichlorohydrin resin, a cycloaliphatic diepoxide, or a glycidyl ester or ether. Specific examples of the latter types of epoxy components have been described hereinabove. However, in view of the difference in performance (e.g. as reflected by the speed of drying, hardness, flexibility, tendency to yellow, and mar-resistance), it is preferred to employ an epoxidized fatty compound (or a mixture thereof) as the predominant (i.e. more than 50 weight percent of the epoxy component) or only epoxy component. Suitable epoxidized fatty compounds are the epoxidized fatty oils (e.g. epoxidized soybean oil and epoxidized linseed oil), epoxidized fatty esters of monohydric alcohols (e.g. epoxidized methyl oleate), epoxidized fatty esters of polyhydric alcohols (e.g. epoxidized tetra tall oil ester of pentaerythritol), epoxidized fatty nitriles (e.g. epoxidized oleyl nitrile), epoxidized fatty amides, epoxidized fatty amines, and epoxidized fatty alcohols. Such epoxidized fatty compounds are already well-known in the art. Typically, these epoxidized fatty compounds will have from 8–26 carbon atoms and preferably from 12–22 carbon atoms in each of the fatty radicals, and have an internal oxirane value of from 4–10%. It is preferable that the oxirane value of the epoxidized fatty compound be at least 5.5%.

Particularly preferred for use as the epoxy component of this invention are the curable epoxidized esters of fatty acids. These epoxidized esters, characterized by internal oxirane rings, will generally contain from 1–10 carbon atoms in the mono- or polyhydric alcohol portion. Illustrative epoxidized fatty acid esters are epoxidized soybean oil; epoxidized linseed oil; epoxidized safflower oil; epoxidized 2-ethylhexyl tallate; epoxidized 1,5-pentanediol dioleate; epoxidized 1,2,6-hexanetriol dioleate monoacetate; epoxidized methyl oleate; epoxidized glycerol monooleate; epoxidized glycerol mono-linoleate; epoxidized glycerol monostearate dilinoleate; and the epoxidized full esters of mono-, di-, or polypentaerythritol with soy, tall or linseed fatty acids. Mixtures of these esters can be used. Epoxidized compounds of different types and oxirane values can be blended together to obtain various properties, e.g. improved resistance to yellowing, improved drying speed, and the like. When a mixture of epoxidized fatty compounds is used, we prefer that the mixture have an average internal oxirane value of at least 5.5%.

The present invention will be further understood by reference to the following examples. Unless otherwise indicated, all parts and percentages are by weight.

Example 1

Into a flask is charged 136 parts of "Epon 828," a commercially available epoxide resin of epichlorohydrin and bisphenol of Formula I where $n$ is between zero and 0.25, 273 parts of chlorendic acid, 103 parts of phthalic anhydride, and 275 parts of xylene. The flask, equipped with a stirrer, thermometer, azeotropic means for removing water such as a condenser and Dean-Stark water trap, is heated to reflux with agitation and held at that temperature until no further water is removed. The initial reflux temperature is 285° F. and after one hour 5 parts of water are distilled out. The reaction mixture is cooled to about 200° F. and 70 parts of Cellosolve acetate are added. The resulting acidic polyester has an acid value of 138 (corrected to 100% NV) and the non-volatile (NV) content is 60%.

Example 2

The procedure of Example 1 is repeated employing 188 parts of "Epon 1001," a commercially available epichlorohydrin-bisphenol resin of Formula I wherein $n$ is about 1,291 parts of chlorendic acid, 108 parts of phthalic anhydride, and 315 parts of xylene. On cooling of the esterification reaction mixture, 75 parts of Cellosolve acetate are added. The resulting acidic polyester thus produced has an acid value of 148 (corrected to 100% NV) and a non-volatile content of 60%.

Example 3

The procedure of Example 1 is repeated employing 100 parts of a diepoxide having the formula:

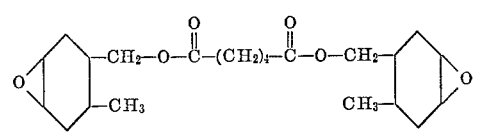

388 parts of chlorendic acid, 264 parts of xylene, and on completion of the estrification reaction, 62 parts of Cellosolve acetate.

The acidic polyester produced is 60% NV, has a viscosity of 3.3 stokes, and an acid value (corrected to 100% NV) of 113.

Examples 4–6

The procedure of Example 1 is repeated in each of the three acidic polyesters produced from the components listed hereinbelow. The acidic polyesters have the properties similarly indicated in Table I below.

TABLE I

| | Example | | |
|---|---|---|---|
| | 4 | 5 | 6 |
| Reagents: | | | |
| "Epon 828",[1] parts | 95 | 75 | 150 |
| Chlorendic Acid, parts | 388 | 388 | 388 |
| Xylol, parts | 250 | 250 | 290 |
| Cellosolve Acetate, parts | 60 | 60 | 70 |
| Total parts | 793 | 773 | 898 |
| Properties: | | | |
| Percent NV | 60 | 60 | 60 |
| Viscosity, stokes | 10.2 | 1.65 | 19.4 |
| Acid Value | 96.5 | 118.3 | 89.3 |

[1] Commercially available epichlorohydrin-bisphenol resin.

Examples 7–15

Using the acidic polyester curing agents of Examples 4–6, various coating compositions are prepared as shown in Table II by admixing an epoxidized vegetable oil in the concentrations shown, with 30 parts of the acidic polyester curing agents of Examples 4–6. More specifically, the carboxyl-terminated polyester is weighed into a container and the epoxy component and solvent added thereto. The components are mixed with a spatula until a clear, homogeneous solution is obtained, requiring from one to three minutes. The mix is conditioned by allowing it to stand unagitated for a period of one-half to one hour to permit all air bubbles formed during the mixing to escape. The properties of the resulting coating compositions are shown in Table II.

Films are prepared on glass panels using a 1.5 mil drawdown bar. Properties of the resulting films, either air-dried or baked, are shown in Table II.

The 200 and 500 g. Zapon tack-free times were determined using the method described on page 121 of the Paint Testing Manual, 12th edition (1962), by Gardner and Sward. The xylene and 5% sodium hydroxide resistances were checked by placing 5 drops of the reagent on the baked film and checking after the designated length of time to establish the changes on a qualitative scale.

soft, flexible primers to hard, mar-resistant finishes can be obtained. These epoxy/polyester blends can be used to form free films, as caulking compounds, as casting resins, laminating resins, adhesives, and the like. If desired, the novel polyester curing agents of the present invention can be blended with other compatible acidic co-reactants.

Although the present invention has been described with a certain degree of particularity, it will be realized that numerous modifications and variations, as well as uses, falling within the spirit and scope of this invention will become obvious to one skilled in this art.

What is claimed is:

1. In a process wherein a coating is formed from a curable epoxidized fatty compound by reaction with a curing agent in the absence of supplemental catalysts and curing agents, the improvement which comprises using as the curing agent a carboxyl-terminated polyester having an acid value of at least 50, said polyester being the esterification product of a polycarboxylic acid compound and an epoxide selected from the group consisting of (a) reaction products of dihydric phenols and epichlorohydrin, having the general formula:

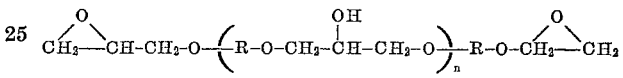

wherein R is the hydroxyl-free residue of the dihydric phenol and $n$ is an integer of 0 to 10; (b) the reaction product of an aliphatic polyol and epichlorohydrin, having the general formula:

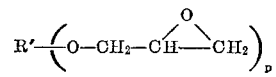

wherein R′ is the unreacted residue of the polyol, and $p$ is an integer of 1 to 4; and (c) a cycloaliphatic epoxide containing at least one oxirane oxygen attached to an aliphatic ring, the overall ratio of carboxylic acid groups to reactive sites on said epoxide being from 1.2–3:1.

2. The process of claim 1 wherein said curable epoxidized compound is an epoxidized $C_8$–$C_{26}$ fatty acid ester having an internal oxirane value of at least 5.5%.

3. The process of claim 2 wherein the carboxyl-terminated polyester of (b) is used as the co-reactant.

TABLE II

| | Example | | | | | | | | |
|---|---|---|---|---|---|---|---|---|---|
| | 7 | 8 | 9 | 10 | 11 | 12 | 13 | 14 | 15 |
| Components: | | | | | | | | | |
| Curing Agent: | | | | | | | | | |
| Example 4 | 30 | 30 | 30 | | | | | | |
| Example 5 | | | | 30 | 30 | 30 | | | |
| Example 6 | | | | | | | 30 | 30 | 30 |
| Compound 303 [1] | 20 | 16.3 | 13.3 | 20 | 16.3 | 13.3 | 20 | 16.3 | 13.3 |
| Xylene | 10 | 8.2 | 6.7 | 10 | 8.2 | 6.7 | 10 | 8.2 | 6.7 |
| Properties: | | | | | | | | | |
| 1 Coating Composition: Percent NV | 60 | 60 | 60 | 60 | 60 | 60 | 60 | 60 | 60 |
| 2 Air-dried film: | | | | | | | | | |
| Hours to pass: | | | | | | | | | |
| 200 gm. Zapon test | 7–8 | 4 | 2.5 | ([2]) | 4 | 3 | 7–8 | 4 | 2.5 |
| 500 gm. Zapon test | ([2]) | 5 | 3.5 | ([2]) | 5 | 3.5 | ([2]) | 5 | 3.5 |
| 24-hr. Sward Hardness | 30 | 48 | 52 | 42 | 48 | 56 | 18 | 40 | 50 |
| 3 Baked films (30 min. at 250° F): | | | | | | | | | |
| Sward Hardness | 44 | 60 | 64 | 28 | 36 | 58 | 36 | 50 | 62 |
| 15 minute Xylene spot test | ([3]) | ([3]) | ([4]) | ([3]) | ([3]) | ([4]) | ([5]) | ([3]) | ([4]) |
| 1 hour 5% NaOH solution spot test | No effect in hardness, slight loss in adhesion, slight brittleness | | | | | | | | |

[1] An epoxidized fatty ester, comprising principally epoxidized soybean oil, having an oxirane value of 7.7% commercially available as a component of "Aroflint 505."
[2] Over 8.
[3] Moderately soft.
[4] Slightly soft.
[5] Very soft.

From the foregoing examples and description, it is clear that the novel acidic polyesters of the present invention can be used as co-reactants with a variety of epoxy components. By varying the amounts and types of the polyester and epoxide, it is possible to obtain a wide variety of film properties. For example, coatings ranging from 4. The process of claim 2 wherein the carboxyl-terminated polyester of (c) is used as the co-reactant.

5. The process of claim 2 wherein the carboxyl-terminated polyester of (a) is used as the co-reactant.

6. The process of claim 2 wherein the co-reactant is carboxyl-terminated polyester wherein the polycarboxylic acid compound is a mixture of 25 to 75 mole percent of a chlorinated polycarboxylic compound and from 75 to 25 mole percent of a cycloaliphatic or aromatic polycarboxylic acid compound.

7. The process of claim 2 wherein the epoxide is the reaction product of bisphenol and epichlorohydrin and the overall ratio of carboxyl groups to reactive sites on the epoxide is from 1.5 to 2.2 and wherein the chlorinated acid compound is chlorendic acid or anhydride.

8. The process of claim 2 wherein the epoxide is a cycloaliphatic diepoxide having the formula:

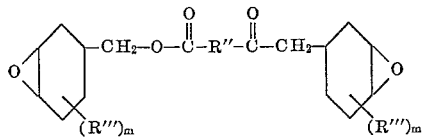

wherein R" is the carboxyl-free residue of a dicarboxylic acid of 1 to 12 carbon atoms, R'" is a lower alkyl radical, and $m$ is 0 to 1.

References Cited
UNITED STATES PATENTS

| | | | |
|---|---|---|---|
| 3,305,501 | 2/1967 | Spalding | 260—18 |
| 3,299,008 | 1/1967 | Mueller | 260—18 X |
| 3,218,274 | 11/1965 | Boller et al. | 260—22 |
| 2,890,204 | 6/1959 | Delmonte | 260—835 X |
| 2,683,131 | 7/1954 | Cass | 260—47 X |

DONALD E. CZAJA, Primary Examiner

C. WARREN IVY, Assistant Examiner

U.S. Cl. X.R.

117—123, 132, 148; 260—18, 22, 830, 835